ROBERT E. KAPTUR
INVENTOR.

Jan. 3, 1961 R. E. KAPTUR 2,966,978
FLUID PRESSURE OPERATED CLUTCH
Filed May 27, 1957 2 Sheets-Sheet 2

ROBERT E. KAPTUR
INVENTOR.

BY Edwin C. McRae
John R. Faulkner
Donald J. Harrington

ATTORNEYS

United States Patent Office

2,966,978
Patented Jan. 3, 1961

2,966,978

FLUID PRESSURE OPERATED CLUTCH

Robert E. Kaptur, Birmingham, Mich., assignor to Ford Motor Company, Dearborn, Mich., a corporation of Delaware Filed May 27, 1957, Ser. No. 661,753

4 Claims. (Cl. 192—106)

My invention relates generally to torque transmitting clutches and more particularly to a new and improved fluid pressure operated clutch construction including a rotatable clutch energizing servo wherein means are provided for neutralizing the effect of centrifugal pressure forces.

My improved clutch construction is particularly adapted to be used with multiple speed, automatic power transmission mechanisms of the automotive type although I contemplate that it may have a variety of other adaptations as well.

Automatic, power transmission mechanisms usually include a system of planetary gears which cooperate to provide a plurality of power delivery paths between a driving member and a driven member, each path being characterized by an independent torque multiplying ratio. The relative motion between the individual gear elements may in turn be controlled by control clutches and brakes to condition the transmission for operation in any of the several operating ratios. The control clutches are often comprised of an assembly of multiple clutch discs carried by independently journaled elements of the gear train and an annular piston may be caused to act against the multiple clutch discs thereby establishing a driving connection between the associated gear train elements. The piston cooperates with an annular cylinder formed in a portion of the rotating clutch structure and it defines therewith an annular working chamber within which actuating fluid may be introduced to energize the clutch assembly. The clutch structure rotates about the geometric axis of the annular working chamber during operation thereby establishing a centrifugal pressure in the working chamber which supplements the force produced by the clutch actuating pressure. Such a pressure buildup is undesirable with clutches of this type since it tends to maintain the clutches in an energized condition after the clutch is disengaged thereby causing an undesirable degree of overlap in the sequential operation of the control clutches and brakes during operation. Also, it is possible that under high speed operation the centrifugal force may be sufficient to cause the clutch to drift into an energized or a partly energized condition under the influence of centrifugal pressure thereby causing excessive wear of the clutch discs and premature clutch failure.

Various types of fluid pressure exhaust valves have been employed to vent the clutch working chamber when the clutch is de-energized thereby preventing a centrifugal pressure buildup behind the clutch servo piston, the vent opening being regulated by a suitable exhaust pressure control valve. However, these prior art arrangements are often costly and complex in construction. Further, many of these valve controlled vent openings delay the pressure buildup behind the servo piston by reason of the direct communication provided thereby between the clutch servo working chamber and the low pressure region of the circuit and this in turn makes it necessary to use a larger capacity pump as the fluid pressure source in order to compensate for the loss of pressurized fluid through the vent opening.

I have provided a new approach to the solution of the above-described problem associated with centrifugal pressure buildup and it comprises a clutch construction wherein mechanical lever elements are employed to transfer the fluid pressure force acting on the servo piston to the assembly of clutch discs. The lever elements are formed with a substantial mass and they are strategically arranged so that the centers of gravity thereof are situated at locations which will give rise to force couples tending to oppose and balance the centrifugal force acting on the servo piston, the lever elements pivoting about one end thereof on the surrounding clutch structure. When the speed of rotation of the clutch increases, the centrifugal pressure head increases as a function of the speed. However, the force couple established by each of the clutch actuating levers increases at the same rate for any given change in clutch speed thus neutralizing and balancing the centrifugal pressure forces.

The provision of an improved clutch construction of the type above-described being a principal object of my invention, it is a further object of my invention to provide a fluid pressure operated clutch capable of inherently compensating for centrifugal pressure buildup in the pressure operated portions thereof at all operating speeds.

It is a further object of my invention to provide an improved clutch construction as above set forth which is simple in construction and which may be readily adapted to be used in a variety of clutch installations.

It is a further object of my instant invention to provide a fluid pressure operated clutch construction employing a pressure operated clutch energizing piston wherein the piston may be urged into a clutch de-energizing position when the clutch actuating pressure is relieved, the force couple operating on the clutch actuating levers exceeding the force couple established by the centrifugal pressure by a predetermined amount thereby eliminating the need for piston return springs.

For the purpose of more particularly describing the principal features of my instant invention, reference will be made to the accompanying drawings wherein.

Figure 2:
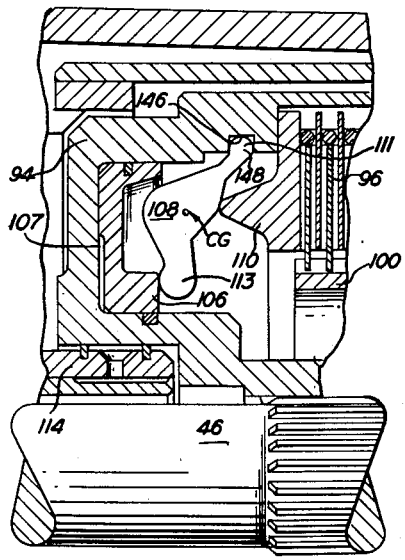
Figure 2 is an enlarged view of a portion of the cross sectional assembly view of Figure 1 showing one embodiment of the clutch construction of my instant invention. The relatively movable pressure operated portions of the clutch construction shown in Figure 2 are shown in the clutch de-energized position.
Figure 3:
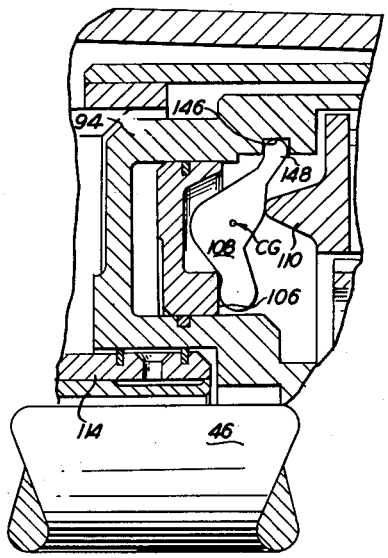
Figure 3 is a view similar to that of Figure 2 wherein the relatively movable portions of the clutch construction are shown in the energized position.
Figure 4:
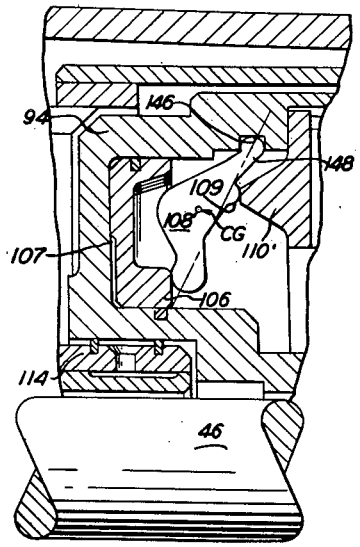
Figure 5:
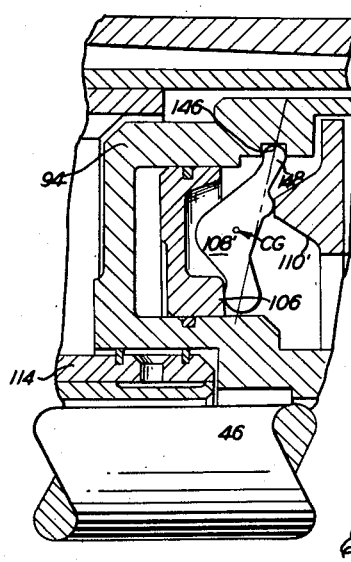

Figure 4 is a partial cross sectional view similar to that of Figures 2 and 3 showing a second embodiment of the improved clutch construction of my instant invention. The relatively movable pressure operated portions of the clutch construction shown in Figure 4 are illustrated in the de-energized positions; and Figure 5 is a view of the second embodiment of my instant invention illustrated in Figure 4 showing the relatively movable pressure operated portions in the energized position.

Figure 1:
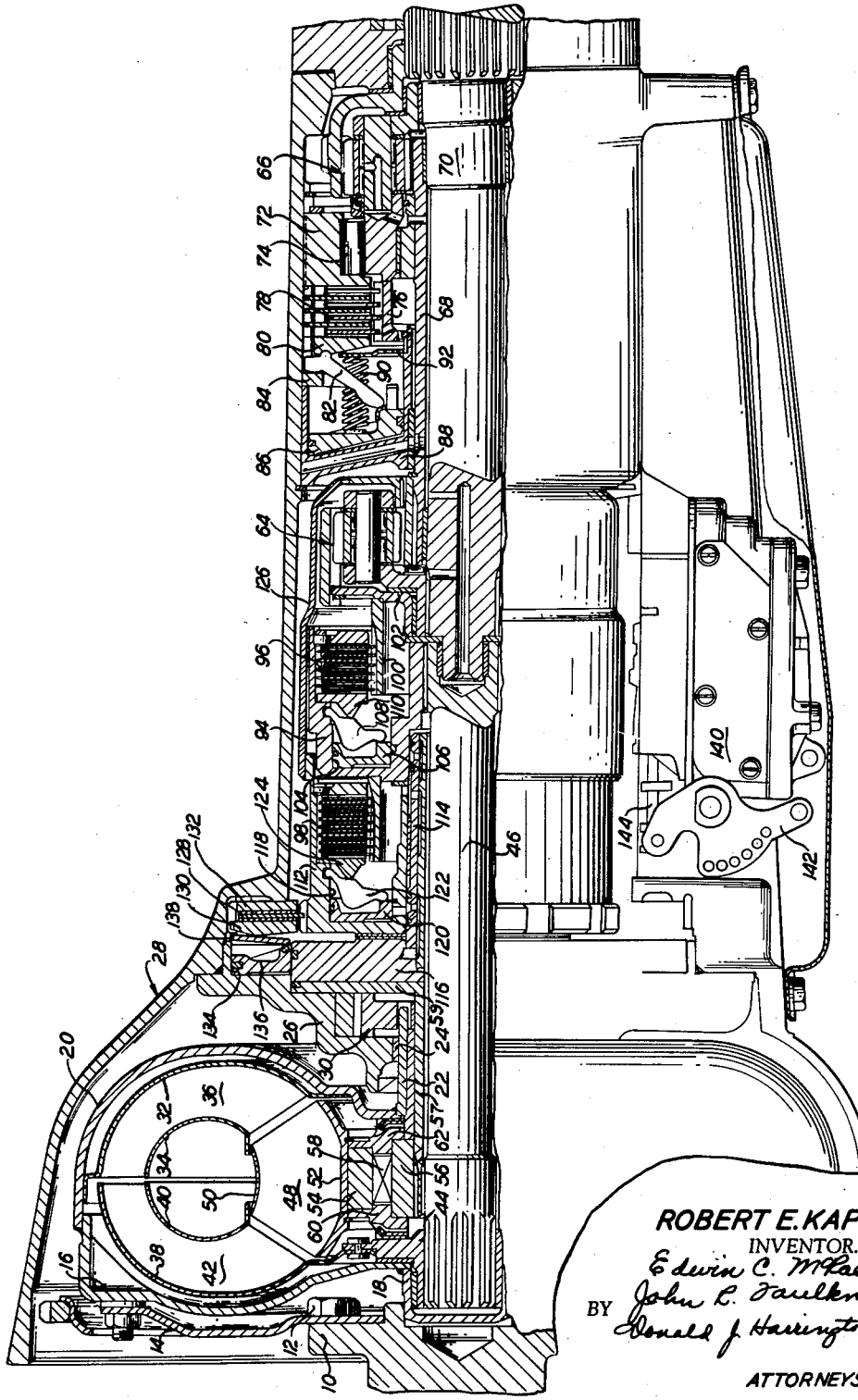
Figure 1 shows a cross sectional assembly view of a planetary type, multiple speed, automatic power transmission mechanism embodying the improved clutch construction of my instant invention.

Referring first to Figure 1, I have illustrated a multiple speed transmission assembly employing control clutches embodying the principles of my instant invention. Numeral 10 designates the flanged end of an engine crankshaft which may be positively secured by bolts 12 to a flywheel 14. The radially outward region of the flywheel 14 may be bolted to a drive plate 16 having a hub 18 which may be received within a central opening formed within the engine crankshaft 10.

The drive plate 16 is positively secured to a torque converter pump casing 20 having an axially extending hub shaft 22 which may be journaled at 24 within a transversely extending wall section 26 of the transmission housing, the latter being generally designated by numeral 28. The wall 26 further defines a pump cavity within which pump gears for the positive displacement pump 30 may be situated, the driving gear for pump 30 being drivably connected to shaft 22.

The casing 20 has secured therein outer and inner pump shrouds 32 and 34 respectively, and a plurality of pump blades 36 are retained by the shrouds 32 and 34 as indicated.

A torque converter turbine member is situated in juxtaposed relationship with respect to the pump member and it is comprised of inner and outer shrouds 38 and 40 respectively. Angularly spaced turbine blades 42 are situated between and retained in place by the inner and outer shrouds, the latter being drivably connected to a turbine hub member 44 which may be splined as indicated to a power delivery shaft 46.

A bladed reactor member is situated between the radially inward bladed sections of the pump and turbine members and it is comprised of a plurality of angularly spaced reactor blades 48 secured in place by reactor shrouds 50 and 52, the latter being centrally apertured to receive a one-way clutch construction comprising an outer race 54, an inner race 56 and roller type clutch elements 58. The clutch assembly is held against axial movement by the spacers 60 and 62 situated on either axial side thereof. Suitable washers may be provided between spacer 60 and the turbine hub 44 and between spacer 62 and the turbine casing 20. Similarly, a thrust washer may be provided between the hub 44 of the turbine member and drive plate 16. The inner race 56 is secured to a relatively stationary sleeve shaft 57 fixed to end plate 59 for the pump 30.

The pump, turbine and reactor members of the converter thus cooperate to define a toroidal fluid circuit wherein the driving pump torque is transferred to the turbine member at a torque multiplication which is greater than unity through the medium of the circulating fluid in the circuit.

The planetary gear portion of the transmission mechanism comprises two spaced simple planetary units designated by numerals 64 and 66, each having a sun gear joined to a common shaft 68. The ring gear for planetary unit 66 and the carrier member for planetary unit 64 may each be positively splined to a power output shaft 70. The carrier for planetary unit 66 may be braked to the relatively stationary anchor member 72 by means of a one-way brake 74. The carrier for planetary unit 66 includes an extension 76 on which is secured a plurality of clutch discs which form a part of a multiple disc brake 78. The brake 78 includes relatively stationary discs secured to the transmission housing as indicated and they cooperate with the discs carried by extension 76. A brake actuating member 80 is situated adjacent the multiple disc assembly 78 and it may be urged into engagement with the latter by means of a lever 82 pivoted on a shoulder 84 carried by the stationary transmission housing 28, the anchor member 72 serving as a reaction member. The lever 82 may be moved toward a brake energizing position by an annular piston 86 mounted within a cooperating annular cylinder defined by brake cylinder housing 88. A plurality of return springs 90 may be provided as shown for urging the piston 86 toward a brake release position, the spring 90 being seated on a spring seat plate 92 carried by housing 88.

Power delivery shaft 46 is positively connected to clutch drive member 94 which carries at separate locations thereon multiple clutch discs for forward clutch drive assembly 96 and for high and reverse clutch 98.

Other clutch discs of the forward clutch drive 96 are carried by an extension 100 on the support member 102 of the ring gear of the pump planetary unit 64.

The clutch member 94 defines an annular cylinder 104 within which an annular piston 106 may be received. The cylinder 104 and piston 106 define a working chamber 107 within which fluid may be introduced to move the piston 106 axially with respect to the transmission housing and the fluid pressure force acting on piston 106 may be transmitted to the forward drive clutch 96 through weighted clutch lever elements 108. It will be readily understood that the elements 108 form a ring about the center of the transmission axis. The elements 108 may be pivoted at a radially outward portion 111 of the clutch member 94 as indicated and the radially inward end thereof, shown at 113, may be contacted by the piston 106. A clutch energizing plate 110 is contacted by the lever elements 108 at points intermediate the radially inward and radially outward ends of the same thereby energizing the clutch plates of the clutch 96. Plate 110 has an annular projection 117 of rounded cross section on which levers 108 act. It is thus apparent that when the working cylinder 104 is pressurized a driving connection will be established between power delivery shaft 46 and the ring gear of the front planetary unit 64.

Alternate ones of the clutch discs for the high and reverse clutch 98 are carried by a drum shaped clutch member 112 which may be rotatably journaled on an extension 114 of a relatively stationary adaptor 116 secured to the wall section 26 of the transmission housing. The clutch member 112 defines an annular cylinder 118 within which is slidably positioned an annular piston 120. The clutch member 112 and the piston 120 define a fluid pressure working chamber and actuating fluid may be introduced therein to urge the piston 120 in a right-hand direction as viewed in Figure 1 thereby pivoting clutch levers 122 in a counterclockwise direction about a pivotal connection between the radially outward ends thereof and the clutch member 112, piston 120 contacting the levers 122 at their radially inward ends. An intermediate portion of the levers 122 engages a clutch plate 124 which in turn acts against the multiple clutch discs of the clutch 98 to provide a driving connection between clutch members 94 and 112.

A torque transmitting member 126 is secured to clutch member 112 and is splined to the sun gear for the front planetary unit 64 thereby causing the latter to turn in unison with the clutch member 112. The outer periphery of clutch member 112 has positively secured thereto a brake disc 128 as indicated and a pair of plates 130 and 132 are situated on either side of the disc 128 as indicated. An annular cylinder 134 is defined by the wall section 26 and the adaptor 116, and an annular working piston 136 is situated therein as indicated. The piston 136 is adapted to move axially to compress the plate 130 into engagement with disc 128 and a Belleville type spring 138 is employed for multiplying the effective braking force applied to the plate 130.

The various clutches and brakes for the transmission above-described may be energized in sequence to establish a shift pattern during operation and automatic controls may be incorporated in the transmission assembly for accomplishing the sequential operation necessary to effect such an automatic shift. A portion of these controls is illustrated in elevation in Figure 1 at the lower portion of the figure as generally designated by numeral 140. A manually operable control lever 142 may be pivoted on the side of the control body and moved by the vehicle operator by means of a suitable range selector linkage mechanism to adjustably position the manual valve within the control body for conditioning the transmission for the various drive ranges, the manual valve being partly illustrated in Figure 1 by numeral 144.

The transmission above described is capable of providing three forward drive speed ratios and a reverse gear ratio depending upon which of the various clutch and brake elements are energized. To obtain the highest reduction ratio it is necessary to energize the forward drive clutch 96 thereby providing a driving connection between power delivery shaft 46 and the ring gear for the front planetary unit 64. The engine torque transmitted to the pump is then multiplied by the torque converter and transferred from the turbine member of the torque converter unit to the power delivery shaft 46. Power is then transferred through the forward drive clutch 96 into the ring gear for the front planetary unit and since the carrier for this planetary unit is connected to the power output shaft 70 the front planetary sun gear will tend to turn in a reverse direction. This causes the sun gear for the rear planetary unit 66 to turn in a reverse direction thus tending to drive the ring gear for the rear planetary unit 66 in a positive direction thus powering the power output shaft 70. The torque reaction for the rear planetary unit 66 is taken through one-way brake 74 and is absorbed by the transmission housing 28. The torque reaction taken by the carrier for the front planetary unit 64 is also in a positive direction and it contributes to the net power output torque applied to the power output shaft 70.

To obtain the intermediate drive ratio, the forward drive clutch 96 remains energized and in addition the second speed brake shown in part at 128 and 136 is energized thereby braking the clutch member 112 and the sun gears for each of the planetary units 64 and 66. Driving power will then be delivered from power delivery shaft 46 through the forward drive clutch 96 into the ring gear for the front planetary unit 64 and the sun gear for the front planetary unit 64 will serve as a reaction member. The carrier for the front planetary unit 64 will thus act as a carrier member and deliver power to the power output shaft 70. The one-way brake 74 will be caused to overrun during intermediate speed operation since the ring gear for the rear planetary unit 66 will be driven at the speed of rotation of the power output shaft 70.

To obtain third speed or high gear operation the second speed brake is de-energized and the high gear clutch 98 is energized while the forward drive clutch 96 remains energized as previously indicated. Since both of the clutches 96 and 98 are simultaneously energized in this fashion the sun gear and the ring gear for the front planetary unit 64 will turn in unison thereby locking up the front planetary gear unit to provide a direct drive between the power input shaft 46 and the power output shaft 70. Since the ring gear for the rear planetary unit 66 is positively connected to the power output shaft 70 and since the sun gear for the rear planetary unit 66 turns with the sun gear for the front planetary unit 64, the rear planetary unit will rotate in unison and the one-way clutch 74 will continue to permit the rear carrier to overrun.

Reverse drive operation may be obtained by disengaging the forward drive clutch 96 and engaging clutch 98, the second speed brake remaining de-energized. Reverse brake 78 is also energized by pressurizing the working chamber defined by the cylinder housing 88 and the piston 86. It is thus apparent that the clutch 98 will establish a driving connection between power delivery shaft 46 and clutch member 126 thus driving the sun gear for the front planetary unit 64 in unison with the converter turbine member. The ring gear for the front planetary unit 64 will float freely since the clutch 96 is disengaged and the rear planetary sun gear will rotate in unison with the front planetary sun gear to drive the rear planetary ring gear and power output shaft 70 in a reverse direction, the carrier for the rear planetary gear unit 66 being braked by a reverse brake 78.

Hill braking may be obtained in two stages with this planetary gear arrangement. To obtain a first hill braking ratio the front clutch 98 may be disengaged and the second speed brake may be engaged while the forward drive clutch 96 remains energized. Power transmitted to the carrier for the front planetary unit 64 through the power output shaft 70 will thus cause the ring gear for the front planetary unit 64 to overspin since the front planetary sun gear is braked. This causes the turbine member to become overspeeded by reason of the connection provided by the forward clutch 96 between front planetary ring gear and power delivery shaft 46. To obtain an increased hill braking ratio, the reverse drive brake 78 may be energized and the front clutch 98 and the second speed brake may be de-energized, the forward drive clutch 96 remaining energized as before. It is thus apparent that the sun gears for each of the planetary units will be overspeeded in a reverse direction and this causes the ring gear for the front planetary unit to become overspeeded at an increased speed ratio by reason of the combined forward braking torque applied to the front planetary carrier and reverse torque on the sun gear. Braking torque is then transmitted to the power delivery shaft 46 and the converter turbine member through the forward drive clutch 96.

It is thus apparent that a centrifugal pressure will be established in the working chamber 107 defined by clutch member 94 and piston 106 whenever the transmission is operating in either a forward drive range or the reverse drive range. Similarly, centrifugal pressure will be established in the working chamber defined by clutch member 118 and piston 120 whenever the transmission is operating in reverse or in high. If no compensation is made for this centrifugal pressure buildup, it would be possible for the forward drive clutch to drift to an engaged or partially engaged position whenever the transmission is operated at high speeds in the reverse drive range. This condition would establish opposed torques which would cause overheating of the clutch plates and premature clutch failure. Similarly the existence of a centrifugal pressure buildup within the high speed clutch servo would tend to delay the disengagement of the high speed clutch 98 during a downshift from high speed range to the second speed range. Since the high speed clutch and the second speed brake must be operated in sequence, any overlap established by the centrifugal pressure buildup in the high speed clutch servo would establish opposed torque thereby causing a rough downshift and overheating of the second speed brake and the high speed clutch elements.

To overcome the adverse effect of this centrifugal pressure buildup the lever elements 122 and 108 for the front and rear clutches 98 and 96, respectively, are each formed with an enlarged intermediate portion of substantial mass, the center of gravity of the lever elements being substantially offset axially with respect to the pivot points therefor. The centrifugal force acting on the clutch lever elements is effective to establish a force couple which tends to urge the servo pistons in a clutch released position and to neutralize the effect of the centrifugal pressure buildup. The force couple established by the centrifugal force acting on the clutch servo levers obviate the need for a conventional clutch return spring.

In order to more particularly illustrate the mode of operation of my improved clutch construction, I have illustrated in more particular detail the elements of the servo mechanism for the direct drive clutch 96 in Figures 3 and 2. In Figure 2 the center of gravity is designated by the letters "CG" and it is substantially offset in an axial direction from the pivot point for the radially outward end thereof. The clutch member 94 may be formed with an annular groove or a recess 146 and the radially outward end of the levers 108 may be rounded at 148 and received within the recess 146 as indicated. The levers 108 are thereby fulcrumed at their outward ends and the intermediate portions thereof which engage plate 110 are canted as shown. The levers 108 will thus be retained in place since the three point support above described will prevent any substantial radial movement of the same. The radially inward end of the levers 108 may similarly be rounded in order that the radial distance of the points of contact between the piston 106 and the levers 108 from the axis of rotation will vary in a uniform fashion as the piston 106 is moved axially toward a clutch engaging position. According to one working embodiment of my instant invention, the mechanical advantage provided by the lever arrangement will vary by reason of the change in the radial distance of the point of contact between the piston 106 and the lever 108 when the piston moves from the position shown in Figure 2 to that shown in Figure 3, the magnitude of the mechanical advantage being 2.36:1 when the piston is in the former position and 2.51:1 when the piston is in the latter position. Also, the piston return force for this same embodiment which is produced by the lever 108 when the turbine speed is 2,000 r.p.m., and when it is in the position shown in Figure 2, is 71.4 pounds. Similarly, the piston return force at 2,000 r.p.m. produced by the lever 108 when in the position shown in Figure 3 is 52.5 pounds.

If desired, the geometry of the levers 108 may be chosen so that the reduction in the piston return force which accompanies an axial movement of the piston 106 will be offset by the change in the mechanical advantage of the lever system thereby tending to establish a more uniform effective clutch pressure.

If it is desired to provide a lever system having a constant mechanical advantage regardless of the position of the piston 106, the design illustrated in Figures 4 and 5 may be adopted. The clutch actuating levers are designated in Figures 4 and 5 by numeral 108' and they are somewhat similar in shape to the previously described levers 108. However, it will be observed that the portion of the levers 108' which contact the clutch energizing plate are rounded as shown at 109, the center of curvature of each portion being aligned with the centers of the rounded radially inward lever end portion 113' and the rounded radially outward lever end portion 111'. The clutch energizing plate is shown at 110' and the portion thereof which engages the levers 108' is formed with a flat apex situated in a transverse plane parallel to the plane of the piston 106 and to the plane of the sides of the piston 106 within which the upper ends of the levers 108' are situated. It is thus apparent that when the piston 106 is moved from the de-energized position illustrated in Figure 4 to the fully energized position illustrated in Figure 5, the mechanical advantage of the lever system will remain constant. Under certain design conditions such a constant mechanical ratio lever system would be desirable. For example, if the clutch is subjected to relatively high rotating speeds, it might be desirable to use such a constant ratio lever system in order that the mechanical advantage of the lever system in the fully disengaged position will be sufficient to insure that the control pressure in the control circuit will be adequate to overcome the opposing centrifugal force couple.

Although I have particularly illustrated certain preferred embodiments of my instant invention, I contemplate that variations in the physical dimensions of the clutch levers and other components of the clutch mechanism may be made as desired depending upon the design requirements and that such changes would not involve a significant departure from the scope of my instant invention as defined by the following claims.

I claim:

1. A fluid pressure operated clutch for delivering torque from a driving shaft to a driven shaft, a first clutch member carried by said driving shaft, a second clutch member carried by said driven shaft, an annular cylinder formed in one of said clutch members, an annular piston positioned in said cylinder and defining therewith an annular working chamber with the axis co-incident with the axis of said shafts, a circular groove formed in said one clutch member, a multiple disc clutch assembly with cooperating portions thereof carried by each of said first and second clutch members, and a lever interposed between said piston and said clutch assembly with one end thereof fulcrumed in said groove, said groove restraining translatory axial movement of said one lever end, the portion of said lever intermediate its ends being enlarged and having a substantial mass, said enlarged portions being located between said piston and a line drawn between said lever ends, said piston being adapted to engage said lever at a point radially inward from said one end, the center of gravity of said lever being displaced axially a substantial distance with respect to said one end toward said piston thereby establishing a force couple which opposes the centrifugal force acting on said piston during operation, said lever engaging one portion of said disc clutch assembly at a location axially displaced from the fulcrum point of said lever.

2. A fluid pressure operated clutch for delivering torque from a driving shaft to a driven shaft, a first clutch member carried by said driving shaft, a second clutch member carried by said driven shaft, an annular cylinder formed in one of said clutch members, an annular piston positioned in said cylinder and defining therewith an annular working chamber with the axis thereof co-incident with the axis of said shafts, a circular groove formed in said one clutch member, a multiple disc clutch assembly with cooperating portions thereof carried by each of said first and second clutch members, said clutch assembly including a circular clutch actuating ring carried by one of said clutch members and having formed thereon a circular and axially extending projection, and at least one lever situated between said piston and said clutch assembly with one of its ends being positioned radially outward with respect to its other end, said one lever end being fulcrumed in said groove, the portion of said lever intermediate its ends being enlarged and having a substantial mass, said enlarged portion being located between said piston and a radial line drawn through said one lever end, said piston being adapted to engage the radially inward rounded end of said lever, an intermediate portion of said lever being adapted to engage the projection of said clutch actuating ring at a location displaced axially toward said piston and the center of gravity of said lever being displaced toward said piston a substantial distance in an axial direction with respect to its said one radially outward end said groove restraining axial movement of said one lever end.

3. A fluid pressure operated clutch for delivering torque from a driving shaft to a driven shaft, a first clutch member carried by said driving shaft, a second clutch member carried by said driven shaft, an annular cylinder formed in one of said clutch members, an annular piston positioned in said cylinder and defining therewith an annular working chamber with the axis thereof co-incident with the axis of said shafts, a circular groove formed in said one clutch member, a multiple disc clutch assembly with cooperating portions thereof carried by each of said first and second clutch members, said clutch assembly including a circular clutch actuating ring carried by one of said clutch members, and a plurality of levers situated between said piston and said clutch assembly with one end of each lever being positioned radially outward with respect to its other end, each of said lever ends being rounded and said one lever ends being fulcrumed in said groove, said piston being adapted to engage the radially inward rounded lever ends, an intermediate portion of said levers being adapted to engage said clutch actuating plate the portion of said lever intermediate its ends being enlarged and having a substantial mass, said enlarged portion being located between said piston and a radial line drawn through said one lever end the centers of gravity of said levers being displaced toward said piston a substantial distance in an axial direction with respect to said radially outward ends, the intermediate lever portions including a rounded projection adjacent said clutch actuating plate, said projection being adapted to engage the clutch plate at a location displaced axially toward said piston, the centers of curvature of said rounded projection and the ends of each lever lying on a substantially straight line and said groove being adapted to restrain axial movement of said one lever ends.

4. In a fluid pressure operated clutch comprising a fluid pressure operated piston and a multiple disc clutch assembly; a plurality of clutch actuating levers situated between said piston and said clutch assembly comprising rounded end portions and an intermediate portion enlarged relative to the end portions thereof to provide a substantial mass, said intermediate portions each including a rounded projection, the centers of curvature of said end portions and said rounded projection of each lever defining a substantially straight line, one lever end portion of each lever being pivoted on said clutch assembly and the other lever end portion of each lever being engageable with said piston, the centers of gravity of said levers being displaced from the pivot point of said one lever end portions toward said piston said enlarged intermediate lever portions being located between said piston and said straight line.

References Cited in the file of this patent

UNITED STATES PATENTS

| | | |
|---|---|---|
| 828,647 | Gibbs | Aug. 14, 1906 |
| 1,272,745 | White | July 16, 1918 |
| 1,938,914 | Kress | Dec. 12, 1933 |
| 2,023,597 | Klocke | Dec. 10, 1935 |
| 2,252,906 | Williamson | Aug. 19, 1941 |
| 2,568,135 | Vincent | Sept. 18, 1951 |
| 2,806,568 | Bliss | Sept. 17, 1957 |
| 2,880,835 | Hass | Apr. 7, 1959 |

FOREIGN PATENTS

| | | |
|---|---|---|
| 829,074 | France | Mar. 7, 1938 |